US008082599B2

(12) United States Patent
Sajic

(10) Patent No.: US 8,082,599 B2
(45) Date of Patent: Dec. 27, 2011

(54) BODY PROTECTING DEVICE

(75) Inventor: Peter Sajic, Broadstone (GB)

(73) Assignee: Lloyd (Scotland) Limited (GB)

( * ) Notice: Subject to any disclaimer, the term of this patent is extended or adjusted under 35 U.S.C. 154(b) by 1057 days.

(21) Appl. No.: 10/583,343

(22) PCT Filed: Dec. 7, 2004

(86) PCT No.: PCT/GB2004/005149
§ 371 (c)(1),
(2), (4) Date: Aug. 27, 2007

(87) PCT Pub. No.: WO2005/060778
PCT Pub. Date: Jul. 7, 2005

(65) Prior Publication Data
US 2008/0120764 A1    May 29, 2008

(30) Foreign Application Priority Data

Dec. 20, 2003  (GB) .................................. 0329612.6
Apr. 23, 2004  (GB) .................................. 0409065.0

(51) Int. Cl.
*A42B 3/00*  (2006.01)
(52) U.S. Cl. ...................... 2/411; 2/410; 2/412
(58) Field of Classification Search ............... 2/410–422
See application file for complete search history.

(56) References Cited

U.S. PATENT DOCUMENTS

| 2,477,852 | A | * | 8/1949 | Bacon ............................ 428/116 |
| 3,447,163 | A | * | 6/1969 | Tojeiro et al. ....................... 2/412 |
| 3,811,130 | A | * | 5/1974 | Townsend, Jr. ................. 2/175.1 |
| 3,829,900 | A |   | 8/1974 | Marangoni |
| 3,877,076 | A | * | 4/1975 | Summers et al. ................. 2/414 |
| 4,484,364 | A | * | 11/1984 | Mitchell et al. .................... 2/413 |
| 4,534,068 | A | * | 8/1985 | Mitchell et al. .................... 2/414 |
| 4,558,470 | A | * | 12/1985 | Mitchell et al. .................... 2/414 |
| 4,627,114 | A | * | 12/1986 | Mitchell ............................ 2/414 |
| 5,349,893 | A | * | 9/1994 | Dunn ........................... 89/36.05 |
| 5,518,796 | A | * | 5/1996 | Tsotsis .......................... 428/116 |
| 5,918,309 | A | * | 7/1999 | Bachner, Jr. ....................... 2/2.5 |
| 5,942,307 | A |   | 8/1999 | Hellermann et al. |
| 6,336,220 | B1 | * | 1/2002 | Sacks et al. ......................... 2/22 |
| 7,089,602 | B2 | * | 8/2006 | Talluri ............................... 2/411 |
| 7,150,217 | B2 | * | 12/2006 | Kershaw ..................... 89/36.05 |
| 7,254,843 | B2 | * | 8/2007 | Talluri ............................... 2/411 |

FOREIGN PATENT DOCUMENTS

EP         0047712 B1      3/1982
(Continued)

OTHER PUBLICATIONS

International Search Report for PCT/GB2004/005149 (Dated Mar. 21, 2005).
International Preliminary Report on Patentability for PCT/GB2004/005149 (Dated Nov. 1, 2005).
Written Opinion for PCT/GB2004/005149 (Dated Jul. 7, 2005).

*Primary Examiner* — Shaun R Hurley
*Assistant Examiner* — Andrew Sutton
(74) *Attorney, Agent, or Firm* — Flaster/Greenberg P.C.

(57) ABSTRACT

A body protecting device for wearing by a user comprising an array of energy absorbing cells, wherein each cell comprises a tube, and wherein substantially each tube has a side wall which is near or adjacent to the side wall of at least another tube, and wherein substantially each tube is configured such that the orientation of the tube is substantially maintained when a load is applied parallel to the axis of the tube.

14 Claims, 4 Drawing Sheets

FOREIGN PATENT DOCUMENTS

| | | |
|---|---|---|
| EP | 0048442 A1 | 3/1982 |
| EP | 0881064 A2 | 12/2000 |
| FR | 2370448 | 6/1978 |
| WO | WO 94/00031 A1 | 1/1994 |

* cited by examiner

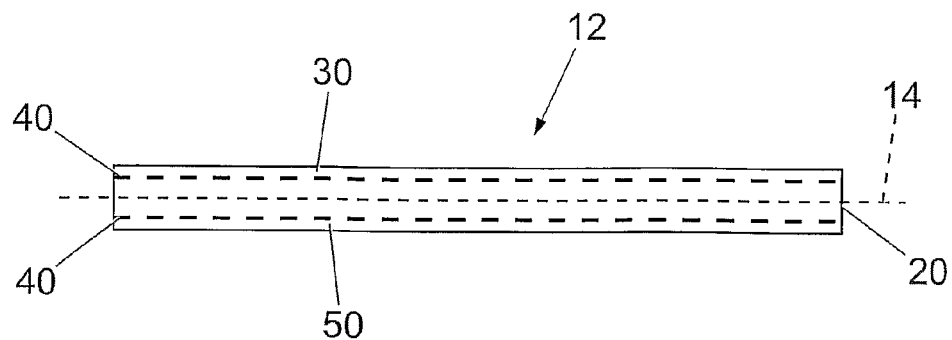
Fig. 2
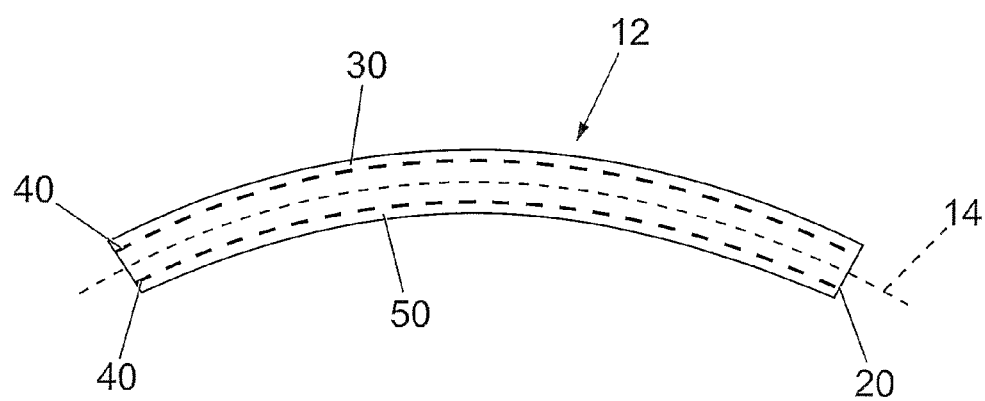
Fig. 3
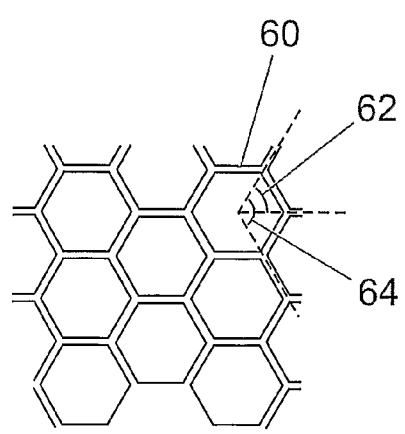 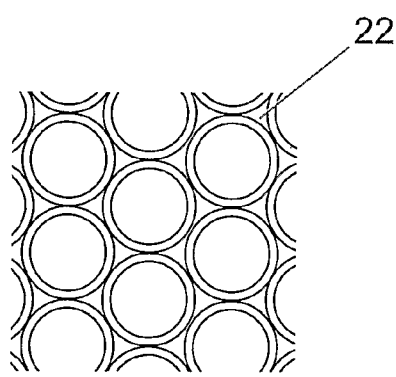
Fig. 4  Fig. 5

BODY PROTECTING DEVICE

CROSS REFERENCE TO RELATED APPLICATIONS

This application is a National Phase Application based on PCT/GB2004/005149, filed Dec. 7, 2004, the content of which is incorporated herein by reference, and claims the priority of Great Britain Patent Application Nos. 0329612.6, filed Dec. 20, 2003, and 0409065.0, filed Apr. 23, 2004, the contents of both of which are incorporated herein by reference.

The present invention relates to body protecting devices. In particular, but not exclusively, the invention relates to the energy absorbing materials used in devices having a relatively large curvature such as safety helmets, elbow pads, knee pads, shoulder pads and the like, and methods of forming such materials.

Many body protecting devices have a large curvature, κ, which is defined as the inverse of the radius of curvature, ρ, for the device. The device, such as a safety helmet, may require a permanently curved shape. Other devices, such as pads for elbows, knees and shoulders, may have to be sufficiently flexible to elastically adopt such a curved shape in response to movements of the body. Suitable materials and forming methods must be used for these devices.

Crash helmets conventionally comprise a substantially spheroidal outer skin of tough plastics material and an inner skin of resilient material such as a hard foam. The rigid outer skin transmits an impact load more evenly to the inner skin which absorbs the energy imparted by the impact load. The helmets are formed in a female mould, or around a male mould, and the materials must undergo significant curvature to form the spheroidal shape. Also, the outer and inner skins must be inserted separately to the mould. Otherwise, during bending, the bond between the two materials would prevent the necessary slippage of the outer skin (which is stretched) relative to the inner skin (which is compressed), or else would produce high planar stresses at the internal and external surfaces.

It may be desirable to decrease the total mass of the helmet. Also, the methods of forming the helmets, which typically involve hand lay-up, tend to be complex and expensive. It would be advantageous to be able to insert the inner and outer skin as a one-piece material within the mould.

Axially loaded columns of various cross sectional shapes have been used for some time to improve the structural crashworthiness of vehicles, roadside furniture and the like. The columns of each of these known systems are typically unconnected and function independently. Regardless of the material from which the columns are formed, a global buckling failure mode (or a local failure which leads to failure of the whole column) is to be avoided as this does not efficiently absorb impact energy.

It is desirable that metal columns exhibit a multiple local buckling and folding failure mode which is effective in absorbing impact energy. Plastic and composite columns have a number of failure modes which are efficient for absorbing impact energy but all of the modes typically involve progressive crushing of one end of the column.

The performance and failure mode of plastic and composite columns depends on a complex interaction of a number of different parameters including the material used, the geometry (shape and thickness), fibre alignment in composites, the use of triggers, and the loading conditions. However, a careful selection of these parameters can result in a safety device which outperforms the metal equivalent.

Regardless of the material used, arrays of independent columns arranged parallel to the load have generally been found to increase energy absorbing performance and improve the stability of the safety device. Columns tend to produce a relatively constant level of energy absorption as the column is progressively buckled of crushed. Axially loaded cones have been found to produce a more linearly increasing rate of energy absorption which can often be more desirable in crash situations. However, as the columns are independent, a localized load can cause an undesirable global failure of columns which have an axis which is offset from the axis of the applied load. Also, as the columns are independent, the columns are formed to be relatively thick to avoid instability during loading.

Sandwich panels, consisting of two tough outer skins separated by a core material having a lower stiffness, have been used in many applications such as building components and structural panels for road vehicles and aircraft. A popular core consists of a honeycomb structure, that is an array of cells, each cell having a hexagonal cross-section. However, these cells, or cells of other cross-sections cannot be regarded as connected columns since each side wall is shared with the neighboring cells. If one cell experiences local failure or instability then this will affect the neighboring cells.

The axis of each longitudinal member is normal to the plane of the inner and outer skins and each end of each longitudinal member is typically bonded to the respective skin. Therefore, the honeycomb structure represents an array of cells arranged parallel to a load which impacts the plane of one of the outer skins.

WO 94/00031 discloses a safety helmet which includes a honeycomb sandwich structure. Generally, a hand lay-up method is used. EP 0881064 discloses a protective element which also has a honeycomb sandwich structure. The document states that the element may be incorporated within a wide range of protective clothing which includes helmets.

U.S. Pat. No. 3,877,076 discloses a helmet having an array of tubes. Each of the tubes is spaced apart and independent from the others.

U.S. Pat. No. 4,534,068 also discloses an array of tubes which are spaced apart. A local crippling failure is described.

Honeycomb structures are suitable for applications involving flat panels or structures with only a relatively small curvature. However, problems arise when the material is used in items having a large curvature.

Each hexagonal cell of the honeycomb structure has a rotation symmetry angle of n.60°. The cell therefore does not have rotation symmetry about an angle of 90°. The cell is therefore not orthotropic, that is it has a different response to a load applied at a first angle than to a load applied at a second angle which is applied at 90° from the first angle. When forming a helmet, the material is bent around a mould about two orthogonal axis to form the spheroidal shape. Therefore, a hexagonal structure can create difficulties when trying to achieve the curvature desired.

Furthermore, a hexagonal structure is by nature anticlastic, in that a positive curvature about an axis results in a negative curvature about an orthogonal axis (the shape of a saddle illustrates this phenomenon). This again leads to difficulties in the forming process.

Furthermore, there are disadvantages in using a honeycomb structure for devices such as pads which must elastically deform to a large curvature. These disadvantages include the relatively rigid nature of the structure. A hexagonal element can be considered to be six flat plates, each of which are rigidly fixed at each longitudinal edge. It is known theoretically and empirically that such elements, and structures produced from these elements are relatively inflexible. A pad produced from such a material can tend to feel stiff and less comfortable. It is desirable that comfort be improved without any sacrifice in the energy absorbing capability of the device.

According to a first aspect of the present invention there is provided a body protecting device for wearing by a user comprising:

an array of energy absorbing cells, wherein each cell comprises a tube, and wherein substantially each tube has a side wall which is near or adjacent to the side wall of at least another tube, and wherein substantially each tube is configured such that the orientation of the tube is substantially maintained when a load is applied parallel to the axis of the tube.

The term "tube" is used to denote a hollow structure having any regular or irregular geometry. Preferably the tube has a cylindrical or conical structure, most preferably a circular cylindrical or circular conical structure. The circular tubular array results in a material which is substantially isotropic and substantially non-anticlastic.

Preferably the body protecting device comprises a safety helmet. Alternatively, the body protecting device comprises a safety pad.

Preferably substantially each tube has a side wall which abuts the side wall of at least another tube. Preferably substantially each tube has a side wall which is connected to the side wall of at least another tube.

Preferably substantially each tube has a side wall which is connected to the side wall of at least another tube by an adhesive. Preferably substantially each tube has a side wall which is connected to the side wall of at least another tube substantially along the length of the tube.

Alternatively, substantially each tube has a side wall which is welded or fused to the side wall of at least another tube.

One or more tubes may be formed from an inner core comprising a first material and an outer core comprising a second material. Preferably each of the first and second material is a polymer. Preferably the second material has a lower melting temperature than the first material. Preferably the first material comprises polyetherimide. Preferably the second material comprises a blend of polyetherimide and polyethylene terephthalate.

Preferably substantially each tube is near or adjacent to at least three other tubes. Preferably substantially each tube is near or adjacent to six other tubes.

Preferably each tube has a diameter of between 2 and 8 mm. Preferably each tube has a diameter of about 6 mm.

Preferably the thickness of the side wall of each tube is less than 0.5 mm. Preferably the thickness of the side wall of each tube is between 0.1 and 0.3 mm.

Preferably the length of each tube is less than 50 mm. Preferably the length of each tube is between 30 and 40 mm.

Preferably the array of energy absorbing cells is provided as an integral material. Preferably the integral material has, or can deform to, a large curvature.

Preferably the integral material comprises polycarbonate, polypropylene, polyetherimide, polyethersulphone or polyphenylsulphone. Preferably the material comprises Tubus Honeycombs™.

According to a second aspect of the present invention there is provided a liner for a body protecting device for wearing by a user, the liner comprising:

a first material having an array of energy absorbing cells, wherein each cell comprises a tube, and wherein substantially each tube has a side wall which is near or adjacent to the side wall of at least another tube, and wherein substantially each tube is configured such that the orientation of the tube is substantially maintained when a load is applied parallel to the axis of the tube.

Preferably the body protecting device comprises a safety helmet. Alternatively, the body protecting device comprises a safety pad.

According to a third aspect of the present invention, there is provided a body protecting device comprising:

a first material bonded to a second material using an adhesive, wherein the adhesive has a melt temperature which is lower than the melt temperature of the first and second material.

Preferably the body protecting device comprises a safety helmet. Alternatively, the body protecting device comprises a safety pad.

Preferably the first and second materials are in a softened state at the melt temperature of the adhesive. This allows thermoforming of the helmet at the melt temperature of the adhesive, as the melted bond allows relative movement between the first and second materials.

Preferably the first material is one of a polycarbonate, polypropylene, polyetherimide, polyethersulphone or polyphenylsulphone material.

Preferably the second material is a plastics material, such as polyetherimide. Preferably the second material is a fibre reinforced plastics material. Preferably the fibres are made from glass or carbon.

Preferably the adhesive is a thermoplastic. Preferably the adhesive is a polyester based material.

Preferably the melt temperature of the adhesive is less than 180° C. Preferably the melt temperature of the adhesive is between 120° C. and 140° C.

Preferably the body protecting device is heated during forming to between 155° C. and 160° C.

Preferably the body protecting device further comprises a third material and the first material interposes the second and third materials. Preferably the first material is bonded to the third material using the adhesive.

Preferably the first material has an array of energy absorbing cells, each cell comprising a tube.

According to a fourth aspect of the present invention there is provided a method of forming a body protecting device comprising:

bonding a first material to a second material using an adhesive, wherein the adhesive has a melt temperature which is lower than the melt temperature of the first and second material.

Preferably the body protecting device comprises a safety helmet. Alternatively, the body protecting device comprises a safety pad.

Preferably the method includes selecting first and second materials which are in a softened state at the melt temperature of the first material.

Preferably the method includes heating the body protecting device during forming to between 155° C. and 160° C.

Preferably the method includes bonding the first material to a third material using the adhesive. Preferably the first material has an array of energy absorbing cells, each cell comprising a tube.

An embodiment of the present invention will now be described, by way of example only, with reference to the accompanying drawings, in which:

FIG. 2 is a side view of the sandwich panel used to form the helmet of FIG. 1;

FIG. 3 is a side view of the sandwich panel of FIG. 2 in a curved state;

FIG. 4 is a plan view of a known arrangement of cells used for the core of a sandwich panel.

FIG. 5 is a plan view of a tubular array of cells used in the sandwich panel of FIG. 2;

Figure 1:
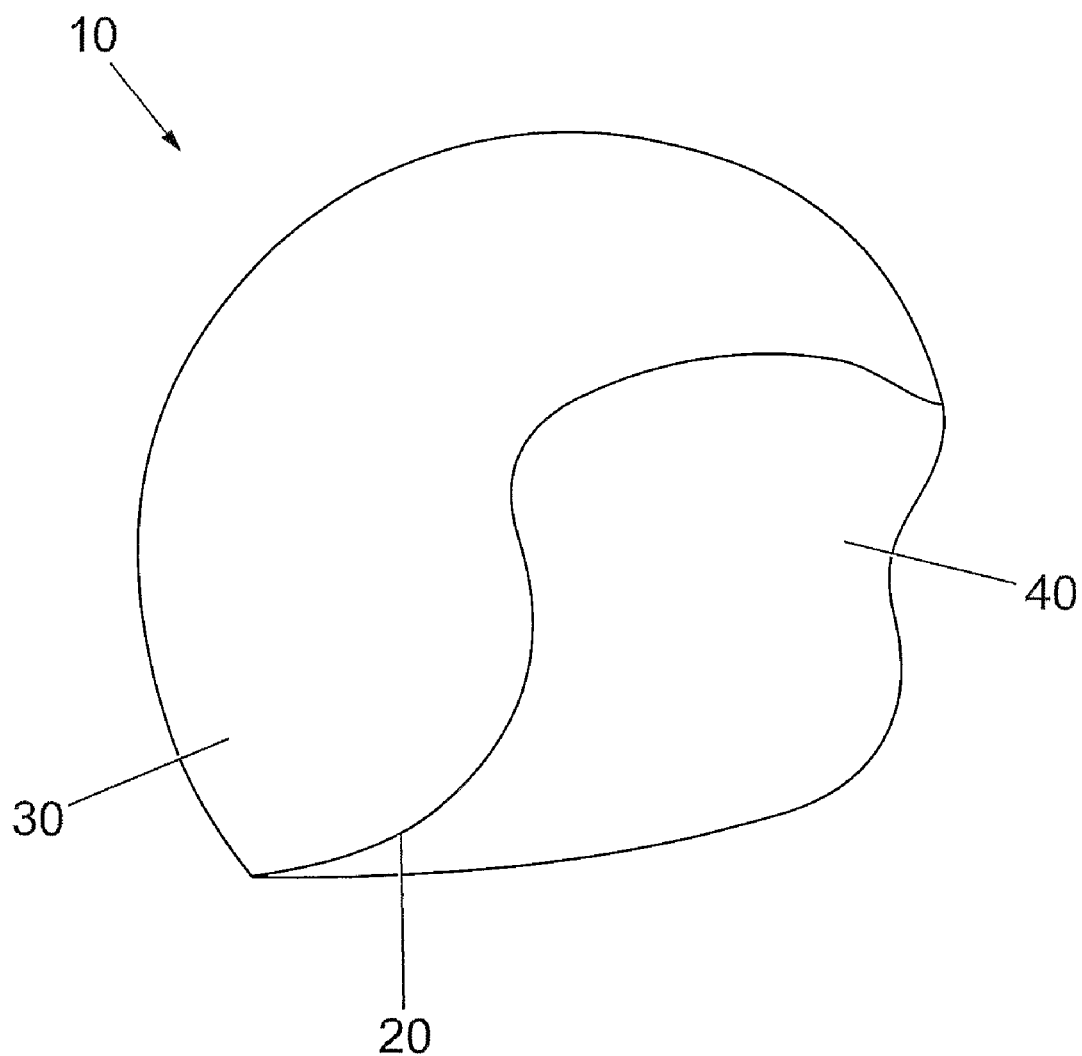
FIG. 1 is a perspective view of a safety helmet in accordance with the present invention.

Referring to FIGS. 1 to 3, there is shown a body protecting device in the form of a safety helmet 10. The helmet 10 is formed using a panel 12 which comprises a first material or core 20 which is sandwiched by a second material or outer skin 30 and a third material or inner skin 50. Each of the outer 30 and inner 50 skins are bonded to the core using an adhesive 40.

FIG. 3 shows the sandwich panel 12 in a curved state. In such a state, the material varies linearly from a state of zero stress (in respect of the major planes of the panel 12) at the neutral axis 14 to a state of maximum tensile stress at the exterior face of the outer skin 30 and a state of maximum compressive stress at the interior surface of the inner skin 50. These tensile and compressive stresses cause tensile and compressive strains respectively. Therefore, there is slippage between the outer skin 30 and the core 20 and the inner skin 50 and the core 20 unless this slippage is prevented by the adhesive 40.

A known core structure is a honeycomb or hexagonal arrangement which is shown in FIG. 4. Each hexagonal cell 60 has a rotation symmetry angle 62, 64 of 60°, 120° and so on, or in other words of n.60°, where n is an integer. Therefore, the cell does not have a rotation symmetry angle of 90° and so the overall material is not orthotropic. Also, the material will be anticlastic.

Furthermore, the honeycomb cells 60 cannot be regarded as connected columns since each of the six side walls of each cell 60 is shared with the neighboring cells.

FIG. 5 shows an array of cells for the core material 20 according to the invention. Each cell comprises a tube 22. The tubes 22 are arranged in a close packed array such that the gap between adjacent tubes is minimised. Each tube has a diameter of 6 mm, a thickness of between 0.1 and 0.3 mm, and a length of around 35 mm. This results in a slenderness ratio (the ratio of the length to the diameter) of between 100 and 350, and an aspect ratio (the ratio of the diameter to the thickness) of between 20 and 60. It is to be appreciated that these values are one or two orders of magnitude greater than prior art arrangements.

The use of these geometric values, particularly the low thickness used, results in the desirable failure mode of progressive buckling being achieved, even when a polymer material is used for the tubes. Instability, which could lead to a global buckling failure mode, is avoided since the tubes are connected to, and supported by, adjacent tubes. Being connected to six other tubes which are circumferentially spaced around the tube provides such support in any direction normal to the axis of the tube. Therefore, the orientation of each tube (typically parallel to the axis of an applied load) is substantially maintained during progressive local buckling caused by the applied load.

The tubes may be bonded together using an adhesive. Another suitable method is to form the tubes from an inner core of a first material and an outer core of a second material, the cores being co-extruded. The second material can be selected to have a lower melting temperature than the first material. Typically, a difference of between 15 and 20 degrees Celsius can be used. During forming, the tubes can be heated to a temperature between the melting temperature of the first and second material. This causes the side walls of the tubes to become welded or fused together. This method allows easier forming of shapes and gives better consistency during forming.

It is to be appreciated that the tubes need not be connected to provide support to each other, or even be abutting, as long as the tubes are in close proximity such that they come into contact following a small amount of deformation.

It is known empirically that an apparatus according to the invention can provide an efficiency of energy absorption of greater than 80% which is a significantly improvement on prior art devices.

Since each tube 22 has an infinite rotation symmetry angle, the overall tubular array results in a material which is substantially isotropic and non-anticlastic. Nevertheless, the tubes could have cross sections other than circular and still provide a superior energy absorption provided that each tube has a side wall which is near to the side wall of other tubes.

Figure 6:
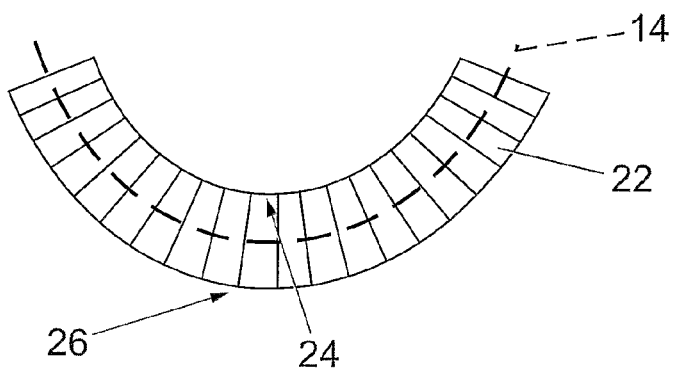
FIG. 6 is a sectional side view of the tubular array of FIG. 5 in a curved state.
Figure 7A:
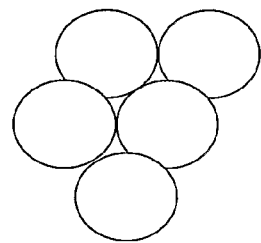
FIGS. 7a, 7b and 7c are exaggerated plan views of positions of the tubular array of FIG. 6 which are compressed, neutral and extended respectively.
Figure 7B:
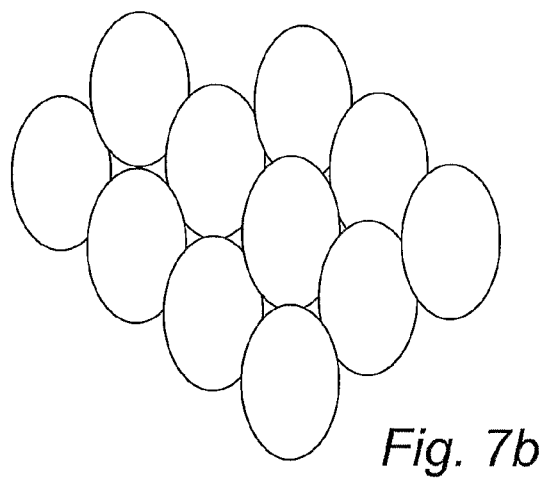
Figure 7C:
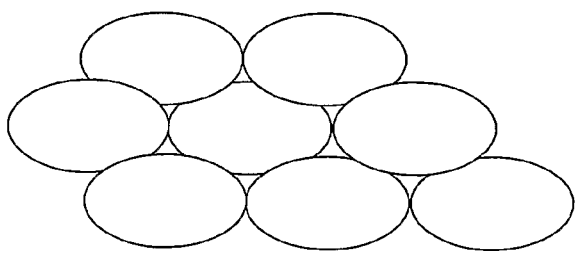

FIG. 6 shows the tubular array in a curved state. As described above, the planar stress and strain at the neutral axis 14 is zero and so each tube 22 retains its circular shape as shown in FIG. 7a. At the inner surface 24, the tubes 22 will be compressed in the direction of the curvature, and the profile of the tubes at this position is shown in exaggerated form in FIG. 7b. At the outer surface 26, the tubes will be elongated in the direction of curvature and the profile of the tubes at this position is shown in FIG. 7c.

It should be noted that, despite compression and extension of the tubes 22, the profile of the tubes 22 when averaged through the thickness of the material 20 will be as found at the neutral axis 14. Also, if there is curvature about an orthogonal axis, this will tend to cause compression and extension in an orthogonal direction, tending to cause the profile of the tubes 22 at any point through the thickness to be as found at the neutral axis 14, although the diameter of the tubes 22 will be reduced at the inner surface 24 and enlarged at the outer surface 26. The tube will in effect be a cone which may even improve the energy absorbing capability of the structure.

Figure 8:
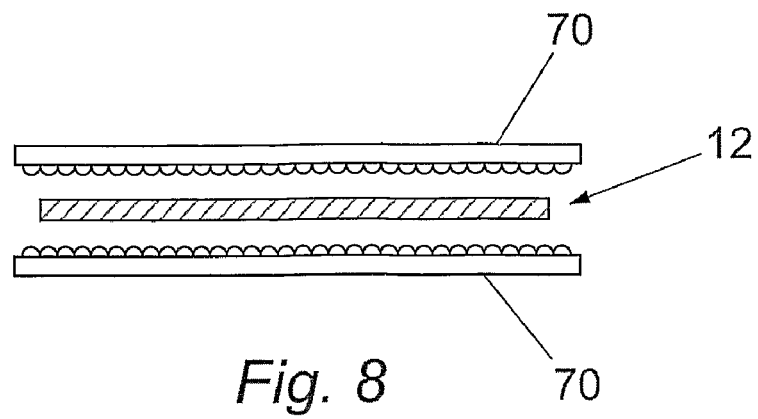
FIG. 8 is a side view of the heating process used for the sandwich panel of FIG. 2.

The helmet is formed using a suitable thermoforming process. As shown in FIG. 8, the sandwich panel 12 is heated using heaters 70 to a temperature of between 155° C. to 160° C., which is above the melt temperature of the adhesive 40.

Figure 9:
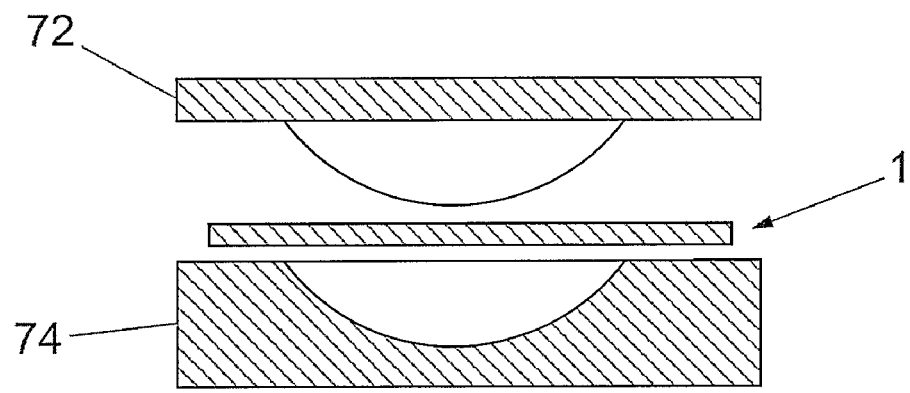
FIG. 9 is a cross sectional side view of a mould used in conjunction with the sandwich panel of FIG. 2.

The sandwich panel 12 is then transferred to a mould as shown in FIG. 9. The male portion 72 of the mould typically has a rubber contacting face and the female portion 74 is typically constructed from aluminium. The mould is at ambient temperature and the transfer of the panel 12 should be effected quickly, preferably in less than 6 seconds to minimise cooling of the panel 12. The male part 72 is then driven towards the female part 74 so that the panel 12 assumes the shape of the mould.

Figure 10:
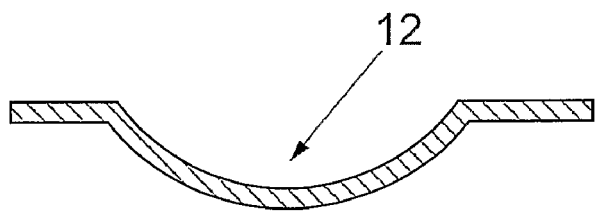
FIG. 10 is the sandwich panel of FIG. 2 in a moulded state.

Since the panel 12 has been heated to above the melt temperature of the adhesive, slippage can take place between the outer skin 30 and the core 20, and between the inner skin 50 and the core 20. Cooling of the panel 12 to a temperature below 50° C. ensures that the panel has assumed the curved profile and the adhesive once again bonds each of the skins 30, 50 to the core 20. The two parts of the mould can now be separated. The curved panel 12 is shown in FIG. 10.

Various modifications and improvements can be made without departing from the scope of the present invention. For instance, the tubes of the array may be conical and have a cone angle of any angle.

The invention claimed is:

1. A body protecting device for wearing by a user and having a curvature therein comprising:
   a first material having an array of energy absorbing cells, each cell comprising a discrete tube,
   a second material being a plastics material,
   the first material being bonded to the second material using an adhesive,
   wherein the adhesive has a melt temperature lower than the melt temperature of the first and second materials to allow relative movement between the first and second materials during thermoforming of a curvature within the materials.

2. The body protecting device of claim 1, wherein the first and second materials are in a softened state at the melt temperature of the adhesive.

3. The body protecting device of claim 1, wherein the first material is one of a polycarbonate, polypropylene, polyetherimide, polyethersulphone or polyphenylsulphone material.

4. The body protecting device of claim 1 wherein the second material is a fiber reinforced plastics material.

5. The body protecting device of claim 1, wherein the adhesive is a thermoplastic.

6. The body protecting device of claim 1, wherein the adhesive is a polyester based material.

7. The body protecting device of any of claim 1, 2, 3, 4, 5 or 6, wherein the melt temperature of the adhesive is less than 180° C.

8. The body protecting device of claim 7, wherein the melt temperature of the adhesive is between 120° C. and 140° C.

9. The body protecting device of claim 8, wherein the first and second materials are heated during forming to between 155° C. and 160° C.

10. The body protecting device of claim 1, further comprising a third material, wherein the first material interposes the second and third materials, and wherein the first material is bonded to the third material using the adhesive.

11. A method of forming a body protecting device for wearing by a user and having a curvature, comprising the steps of:
    providing a first material having an array of energy absorbing cells, each cell comprising a discrete tube,
    providing a second material being a plastics material,
    bonding a first material to a second material using an adhesive,
    wherein the adhesive has a melt temperature which is lower than the melt temperature of the first and second materials, and
    thermoforming a curvature in the second material and allowing for relative movement between the first and second materials during the thermoform heating.

12. The method of claim 11, wherein the first and second materials are in a softened state at the melt temperature of the adhesive.

13. The method of claim 11 or 12, further comprising heating the first and second materials to between 155° C. and 160° C.

14. The method of claim 11 or 12, further comprising the step of bonding the first material to a third material using the adhesive.

* * * * *